United States Patent [19]

Kazino et al.

[11] 4,192,195

[45] Mar. 11, 1980

[54] STARTER WITH A SHOCK ABSORBING ARRANGEMENT

[75] Inventors: Sadayosi Kazino; Tatsuo Doi, both of Nagoya, Japan

[73] Assignee: Nippondenso Co., Ltd., Kariya, Japan

[21] Appl. No.: 919,319

[22] Filed: Jun. 26, 1978

Related U.S. Application Data

[63] Continuation-in-part of Ser. No. 746,745, Dec. 2, 1976, abandoned.

[30] Foreign Application Priority Data

Dec. 3, 1975 [JP] Japan .......................... 50/163765[U]

[51] Int. Cl.² .......................... F02N 11/00; F16D 7/02

[52] U.S. Cl. ...................................... 74/7 A; 64/30 E; 64/39 LB; 74/7 E

[58] Field of Search .................... 74/6, 7 R, 7 A, 7 C, 74/7 E; 64/30 R, 30 L, 30 D, 30 E, 30 A, 30 LB

[56] References Cited

U.S. PATENT DOCUMENTS

| | | | |
|---|---|---|---|
| 950,290 | 2/1910 | Hughes | 64/30 LB |
| 1,231,638 | 7/1917 | Nikonow | 64/30 R X |
| 1,916,173 | 6/1933 | Lansing | 74/7 C |
| 1,962,397 | 6/1934 | Lansing | 74/7 C |
| 3,080,735 | 3/1963 | Blom, Jr. et al. | 64/30 R |
| 3,481,160 | 12/1969 | Georgi | 64/30 R |
| 3,771,372 | 11/1973 | Asahi et al. | 74/7 R |
| 3,788,151 | 1/1974 | Campau | 74/7 R X |
| 3,818,722 | 6/1974 | Vogel | 64/30E |
| 3,930,362 | 1/1976 | Cielaszyk | 64/30 E |

*Primary Examiner*—Allan D. Herrmann
*Attorney, Agent, or Firm*—Cushman, Darby & Cushman

[57] ABSTRACT

In a torque transmitting mechanism of a starter, there is provided a shock absorbing arrangement having an input member and output member. When an abnormal torque appears, the members slip on each other to absorb such shock.

6 Claims, 2 Drawing Figures

11
9
6
7
8a
D
5
10
12
5b
B
5a
8
E
4
3
12
1
A
2
C

STARTER WITH A SHOCK ABSORBING ARRANGEMENT

REFERENCE TO RELATED APPLICATION

This is a continuation-in-part of application Ser. No. 746,745, filed Dec. 2, 1976, now abandoned.

BACKGROUND OF THE INVENTION

This invention relates to a shock absorbing arrangement of a starter for an internal combustion engine.

One of conventional starters for an internal combustion engine comprises a pinion shaft driven by an armature gear through reduction gears. In this type of starter, when the pinion engages with a flywheel gear of an engine while the starter motor is running at high speed, the reduction gears and the pinion shaft may be broken by the shock caused by the abrupt engagement or clash.

SUMMARY OF THE INVENTION

It is an object of the present invention to obviate such inconvenience as above mentioned.

It is a further object of the present invention to provide a simple shock absorbing arrangement between an armature shaft of a starter motor and a pinion shaft thereof. This simple shock absorbing arrangement is attained by providing a torque transmitting connection which may slip when a torque larger than a predetermined value is transmitted.

DESCRIPTION OF THE PREFERRED EMBODIMENT

Figure 1:
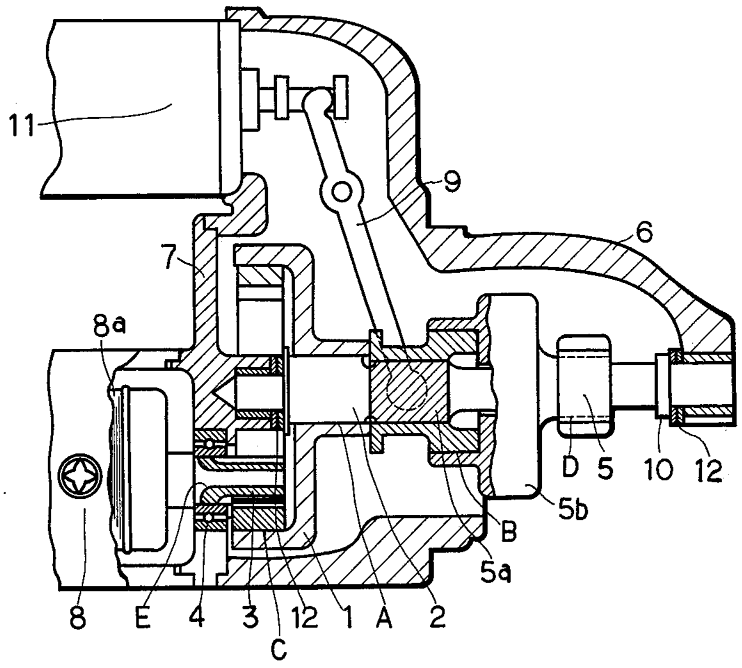
FIG. 1 shows a partial cross sectional view of a starter according to the present invention.

In FIG. 1, an internal gear 1 has a pinion shaft 2 forced thereinto to transmit driving torque to an engine. The connection of the internal gear 1 and the pinion shaft 2 is made so that when the torque greater than a predetermined value arises the portion A between the internal gear 1 and the pinion 2 may slip thereby to form a shock absorbing arrangement.

In this shock absorbing arrangement the internal gear corresponds to an input member and the pinion shaft corresponds to an output member.

On the pinion shaft 2, a pinion 5 is slidingly connected through a helical spline **5*a* and an over running clutch 5*b*. This pinion shaft 2 is carried by a center bearing member 7 and a starter housing 6**.

An armature gear 3 transmits driving torque from a starter motor 8 to the internal gear 1, reducing the speed.

The armature **8*a* of the starter motor 8 is carried by a ball bearing 4 disposed in the center bearing member 7, which is disposed between the starter motor 8 and the housing 6. A lever 9 is connected between the pinion 5 and a solenoid switch 11 to make the pinion 5 slide in response to the operation of the solenoid switch. Numeral 10 is a pinion stop collar disposed at an outer end of the pinion 5. A thrust washer 12 is provided to adjust axial clearance of the pinion shaft 2**.

On the portion designated by A mentioned above solid lubricating material such as molybdenum sulfide may be coated, to facilitate long stability of shock absorbing function.

In operation, when the solenoid switch 11 is energized to pull in the lever 9 to make the pinion 5 slide on the pinion shaft 2 and, at the same time the starter motor 8 runs at a low speed, the pinion 5 engages with a flywheel or ring gear of an internal combustion engine which is not shown.

The main switch of the solenoid switch 11 is, then, closed so that the starter motor 8 runs at a high speed. The driving torque of the starter motor 8 is transmitted, through the armature gear 3, internal gear 1 and pinion shaft 2 to the pinion 5 thereby to crank up an internal combustion engine.

In the engaging operation of the pinion 5 with the flywheel gear and in the engine starting with the high speed running of the starter motor, abnormally large shocks of driving torque often appear.

When those shocks appear the pinion shaft and the internal gear slip relative to each other to absorb such shocks.

The degree of shock absorbing effect is changed by adjusting the clearance between the pinion shaft 2 and the internal gear by way of shrink fitting.

In the above embodiment, the shock absorbing arrangement is provided between the pinion shaft 2 and the internal gear, however, it may be disposed any portion between the armature shaft and the pinion shaft in the drive mechanism. Such places are shown, for example, as B, C, D or E in FIG. 1.

Figure 2:
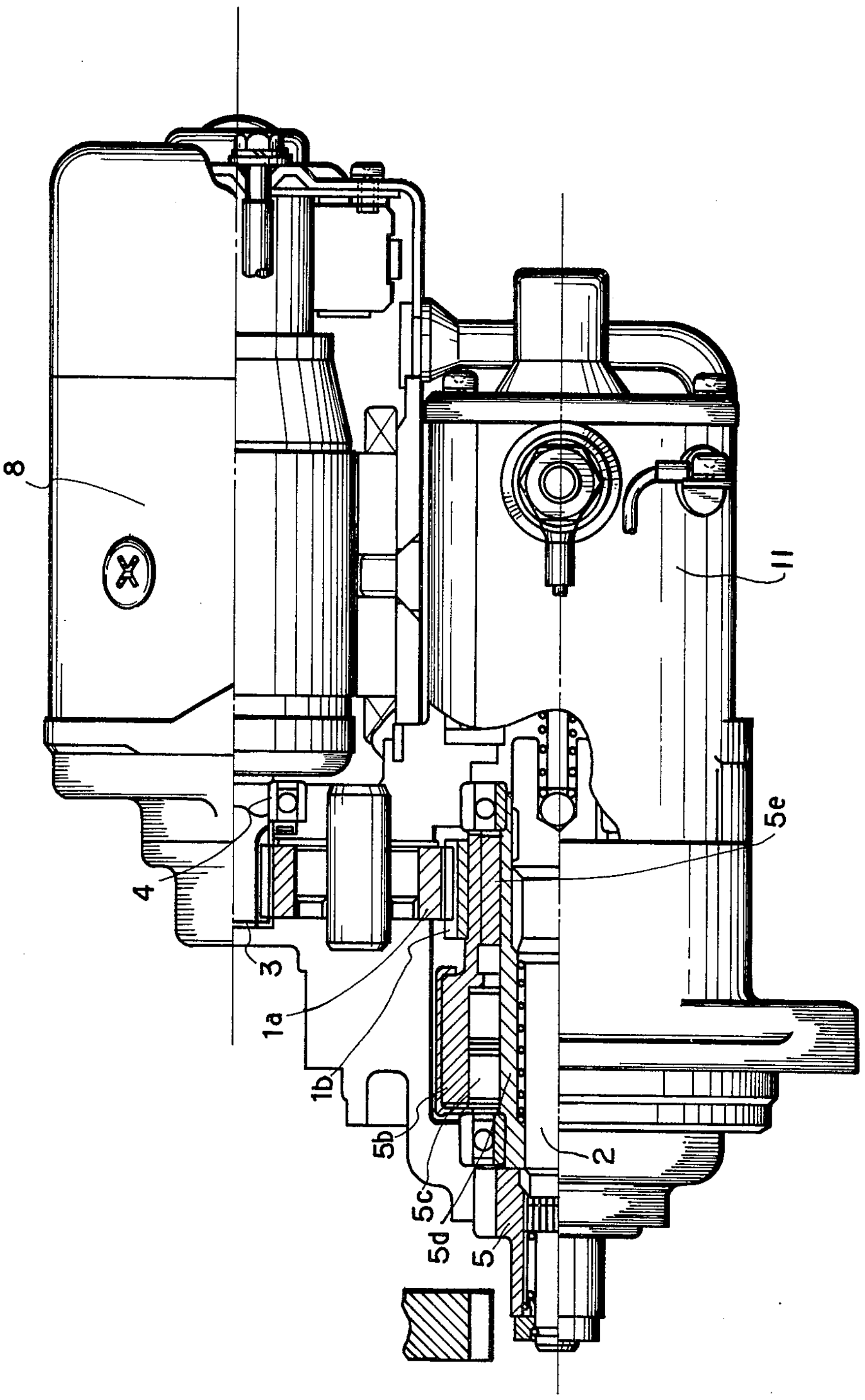
FIG. 2 shows a partial cross sectional view of a different type of starter according to the present invention.

Another embodiment according to the present invention will be explained with reference to FIG. 2, in which the parts and portions which are the same as or equivalent to those of the embodiment shown in FIG. 1 are indicated by same reference numerals. Since the general construction of this embodiment is described in U.S. Pat. No. 3,771,372, only related portions will be explained.

In operation of this embodiment, the driving torque of the starter motor 8 is transmitted through driving gear 3, idle gear **1*a*, driven gear 1*b*, the outer race of clutch 5*b*, clutch rollers 5*c* and spline tube 5*d* to the pinion shaft 2 integral with the pinion 5 to drive a ring gear of an engine. The outer race 5*b* has a tubular extension having a reduced diameter. The driven gear 1*b* has a bore to which the outer periphery of the extension is shrink-fitted. Into the inside of the extension, is secured an oilless metal bearing 5*e* for receiving therein the spline tube 5*d***.

Before they are shrink-fitted, both the driven gear **1*b* and extension are treated with heat to have carbon hardening on the surfaces to be fitted and are ground to have the interfering portion of 0 to 40 microns. Thereafter, the peripheral surface of the extension is bonderized and coated with molybdenum sulfide, preferably, 10 to 25 microns in thickness. The driven gear 1*b* is heated to about 100° C. to allow heat expansion and, thereafter the tubular extension of the clutch outer race 5*b* is forcively inserted into the bore of the driven gear 1*b***.

Since the amount of the interference affects the slip or shock absorbing function, it should be determined in accordance with the type and operating condition of the engine, the output power and reduction ratio of the starter, etc.

It has been found that the greater the diameter of the interface of such a shrink-fitted members, the more effective the shock absorption control. It is noted, however, the clutch outer race directly holding the clutch rollers 5c as shown in FIG. 2 is not appropriate for such an arrangement because the diameter of such portion is changed owing to operation of the clutch roller 5c. That is, when the starter motor is operated to drive an engine the clutch catches the pinion tube by urging the rollers 5c to abut the inner wall of the outer race 5b with the resultant expansion thereof. In the type shown in FIG. 2, it is most preferable to have such a shrink-fit connection between the driven gear and the clutch outer race 5b since the driven gear is the largest in the gear mechanism so that the sufficient diameter of the interfering surface may be ensured and no force is applied to affect the interfering surface.

Thus the shock generated in the engaging operation of the pinion 5 with the flywheel or ring gear may be effectively absorbed owing to the slip between the driven gear 1b and the extension of the clutch outer race 5b.

What is claimed is:

1. A starter for a vehicle comprising:
an electric motor having an armature shaft,
a speed reduction gear mechanism having a drive gear connected to said armature shaft and a driven gear associated with said drive gear and having a bore, said driven gear being the largest in diameter in said speed reduction gear mechanism,
a one way clutch having an axially extending cylindrical member the outer periphery of which is shrink-fitted to the bore of said driven gear through a thin coating of solid lubricating material, and
a pinion connected to said one way clutch.

2. A starter for a vehicle according to claim 1, wherein the interfering portion of said axially extending cylindrical member and the bore of said driven gear is 0 to 40 microns and
the thickness of said coating of solid lubricating material is 10 to 25 microns.

3. A starter for a vehicle comprising:
an electric motor having an armature shaft,
a speed reduction gear mechanism having a smaller drive gear connected to said armature shaft and a larger driven gear having a bore formed therein,
a spline tube,
a pinion having a shaft slidingly disposed in said spline tube,
one way clutch disposed on the periphery of said spline tube and connected between said driven gear and said spline tube, said clutch including axially extending tubular member the outer periphery of which is shrink-fitted into the bore of said driven gear through a thin coating of solid lubricating material, and
solenoid switch means for driving said electric motor and engaging said pinion with the ring gear.

4. A starter for a vehicle according to claim 3, wherein the interfering portion of said axially extending tubular member and the bore of said driven gear is 0 to 40 microns and,
the thickness of said coating of solid lubricating material is 10 to 25 microns.

5. A starter for a vehicle comprising:
an electric motor having an armature shaft,
a speed reduction gear mechanism having a drive gear and a driven gear,
torque transmitting means including a one way clutch and a cylindrical member, having relatively larger diameter than others in said speed reduction gear mechanism, said cylindrical member and said driven gear being shrink-fitted to each other through a thin coating of said lubricating material so that these two members relatively slip when an abnormal shock appears, and
a pinion connected to said torque transmitting means.

6. A starter for a vehicle according to claim 5, wherein the interfering portion of said cylindrical member and said driven member is 0 to 40 microns and
the thickness of said coating of solid lubricating material is 10 to 25 microns.

* * * * *